United States Patent [19]

Baer

[11] E Re. 28,663

[45] Reissued Dec. 23, 1975

[54] FLUID MOTOR AND MATERIAL HANDLING APPARATUS AND THE LIKE UTILIZING SAME

[75] Inventor: James I. Baer, Lakeland, Fla.

[73] Assignee: Baka International Marketing Corporation, New York, N.Y.

[22] Filed: Sept. 22, 1969

[21] Appl. No.: 871,809

Related U.S. Patent Documents

Reissue of:

[64] Patent No.: 3,343,864
Issued: Sept. 26, 1967
Appl. No.: 493,758
Filed: Oct. 7, 1965

[52] U.S. Cl. ..... 294/99 R; 294/86 R; 294/88

[51] Int. Cl. ..... B66c 1/46

[58] Field of Search ..... 294/63, 63 A, 88, 89, 81, 294/99 R; 92/91, 92, 37; 3/1.2, 12

[56] References Cited

UNITED STATES PATENTS

| | | | |
|---|---|---|---|
| 1,693,074 | 11/1928 | Falco | 294/81 |
| 2,768,018 | 10/1956 | Ehmann | 294/63 |
| 3,039,767 | 6/1962 | Staines | 294/88 |
| 3,202,061 | 8/1965 | Johnston | 92/37 |
| 3,284,964 | 11/1966 | Saito | 92/37 |

*Primary Examiner*—Evon C. Blunk
*Assistant Examiner*—Johnny D. Cherry
*Attorney, Agent, or Firm*—Elliot A. Lackenbach

[57] ABSTRACT

*Fluid motor comprising a longitudinally extensive first part adapted for bending at least transversely of its longitudinal extent attached to a second co-extending part which is elongatable relative to the first part in response to fluid pressure application therebetween so that the elongation of the second part produces bending or curling of the first part and material handling apparatus incorporating same.*

21 Claims, 7 Drawing Figures

FLUID MOTOR AND MATERIAL HANDLING APPARATUS AND THE LIKE UTILIZING SAME

Matter enclosed in heavy brackets [ ] appears in the original patent but forms no part of this reissue specification; matter printed in italics indicates the additions made by reissue.

The present invention relates to [apparatus for handling material or objects,] *motors* and more particularly *to motors of the fluid actuated type. The present invention finds particular utility when applied* to [the type of] apparatus which has a power actuated gripping or embracing action by which objects *or materials* can be handled or manipulated, particularly by remote control.

*A primary object of the present invention is the provision of new and novel fluid motors and of methods of providing force and/or movement in response to fluid pressures.*

[The principal] *Another primary* object of the present invention is the provision of [a] new and improved material handling apparatus and the like [which is] capable of gripping [an object] *objects* by [an element] *one or more elements* which [curls about the object] *curl thereabout* in response to fluid pressure applied to the interior thereof to embrace the object *or objects* for *holding, resisting movement, transporting* [transportation] or handling thereof.

*Yet* another *primary* object of the *present* invention is the provision of [a] new and improved handling apparatus of the character [mentioned] *disclosed and described* in which the pressure of the grip about the object *or objects* can be readily regulated, *modified and controlled* according to the fluid pressure *applied.*

A still further *primary* object of the *present* invention is to provide an article of manufacture comprising [an] *a longitudinally extensive bendable* [elongated flexible] part attached between its ends to a second *generally* co-extending part which is *likewise bendable* [flexible] and which may elongate relative to the first part in response to *fluid* pressure applied to the interior thereof so that the *differing* elongation of the [second part] *two parts* produces *a tendency towards* curling *or bending* [of the relatively inelastic first part] *thereof.*

*A yet still further primary object of the present invention is to provide an article of manufacture comprising a longitudinally extensive bendable first part attached at at least two generally longitudinally spaced apart portions to a second generally co-extending part which is likewise bendable and which may elongate relative to the first part in response to fluid pressure applied thereto so that the differing elongation of the two parts produces a tendency towards curling thereof.*

*Still another primary object of the present invention is the provision of articles of manufacture of the class described wherein the elongatable and non-elongatable parts are further joined together along their edges substantially completely between their ends so as to be capable of retaining pressurized fluid directly therebetween.*

*Still further, it is yet another primary object of the present invention to provide articles of manufacture of the class described having a first relatively non-elongatable flat side wall about which the article may bend and a second elongatable wall laterally spaced apart from and secured thereto together with means retaining a fluid therebetween and means for varying the pressure of the fluid to produce elongation of the elongatable wall and thereby a tendency towards bending about the flat side wall.*

*Yet another primary object of the present invention is the provision of methods and apparatus for producing, bending or flexing forces and/or movements in response to fluid pressures.*

Other objects, *features* and advantages of the invention will be apparent from the following description of preferred [forms] *embodiments* thereof, reference being made to the accompanying [including] *drawing* wherein.

Figures 1, 2, 3:
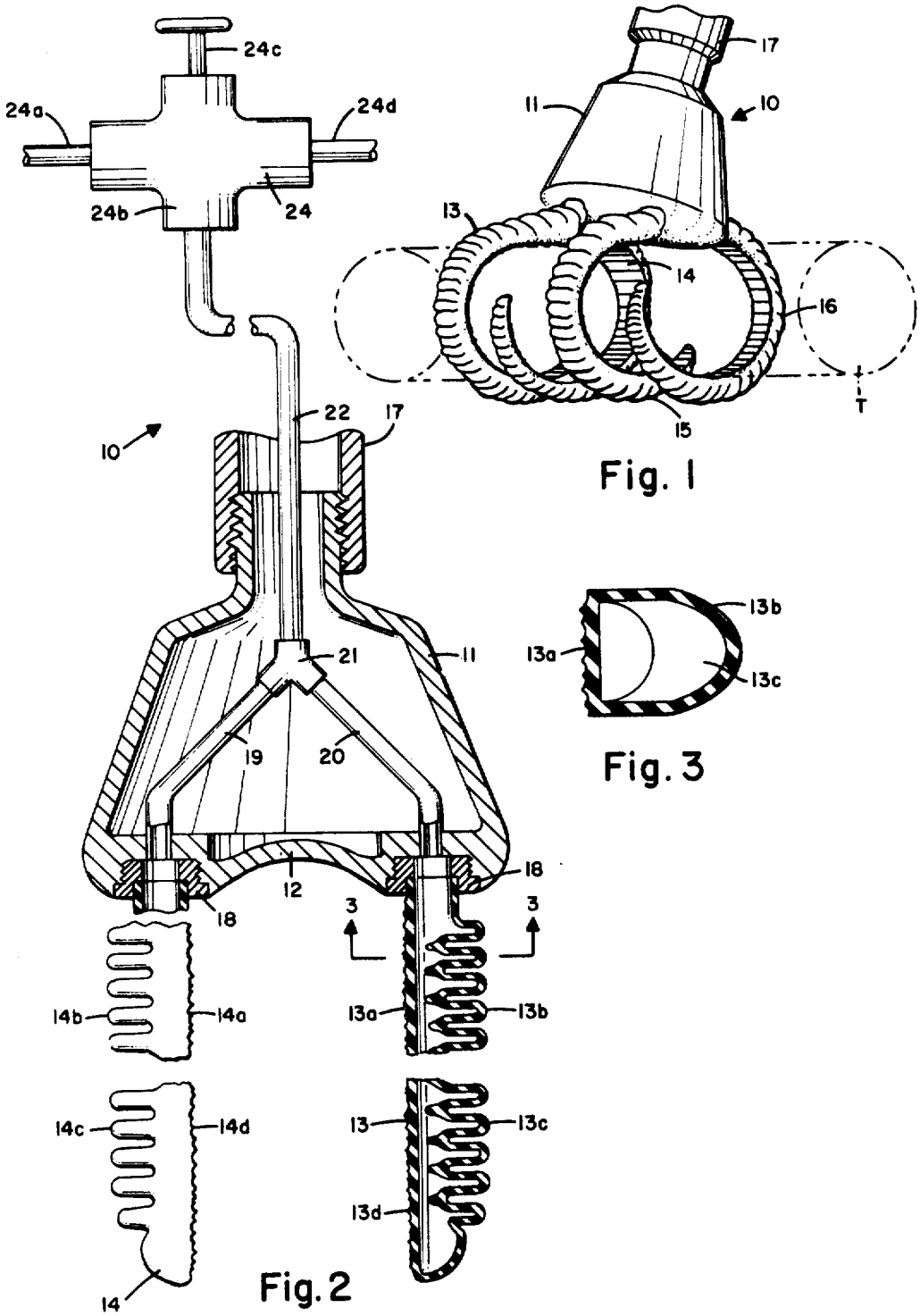
FIG. 1 is a fragmentary perspective view of a material handling device [embodying one form of] *incorporating a fluid motor in accordance with* the *principles of the present* invention.
FIG. 2 is a fragmentary view, [partly] *partially* in section and drawn on a larger scale of the material handling device shown in FIG. 1 [including] *and illustrating schematically* a [schematic] control therefor.
FIG. 3 is a sectional view taken substantially along line 3—3 of FIG. 2.

Referring to FIGS. 1–3, a power operated apparatus 10 *constructed in accordance with the principles of the present invention and incorporating novel fluid motors in accordance with the present invention* is shown for handling objects remote from the operator thereof, [one of which objects is] *such as, by way of example only,* a tubular member T shown in broken lines. The objects handled by the apparatus may be of a type or in an environment in which it cannot be readily handled manually, for example. It is to be understood, however, that the invention could be utilized in many different forms [and] *for providing forces and/or movements, such as,* for handling objects for various purposes, as well as providing merely animation or movement of figures, or for operation of control or indicators responsive to changes in condition which may reflect changes in pressure of fluid.

The apparatus 10 [comprises] *may comprise, for example,* a base member or "hand" 11 having *a surface which may be configured complementary the object to be grasped, such as, for example,* a concave surface 12 [thereon] against which a part of the tube T may engage, and *a number of grasping elements depending upon the shape of the object to be grasped, such as, for example,* two pairs of *fluid motors constructed in accordance with the principles of the present invention and configured to define* fingers 13, 14 and 15, 16 *which may* extend *generally* from opposite sides of the *base member 11 adjacent the* concave surface *12. Where, as in the present example, it is desired to provide apparatus*

*articularly adapted for grasping and manipulating a enerally tubular member*, the fingers [are] *may be* perable to curve *alternately or oppositely* inwardly and *rl around to grasp* [an article] *the object T there-ithin and* therebetween, as is shown.

The hand member 11 may be formed of any suitable aterial, such as, *and without limitation*, cast metal, id [is] *may be* attached to an arm 17 of a mecha-sm, not shown, by which the hand *member 11 and tached fingers 13, 14, 15 and 16* can be manipulated ther manually or by suitable power means, for trans-rting or otherwise handling the objects gripped by e fingers 13–16 and held to the hand proper. The peration of the fingers to grip and release objects can controlled *from substantially any desired location and en* by remotely located control means *such as* de-ribed hereinafter.

Referring to FIG. 2, wherein the apparatus is shown irtly in section taken on a plane transversely of the is of the object T so that the hand member 11 and nger 13 are shown in longitudinally *bisected eleva-onal* cross-section and finger 14 appears in elevation, ch of the fingers 13–16 [comprises] *may comprise* tube of suitable imperforate *bendable* [flexible] aterial, such as, *by example only and without limita-on*, rubber or rubber-like plastic or the like, *which ay be* closed at its outer end *portion* and which has] *may have* an open space *inner* end which may integral with a rigid coupling 18 which [is] *may be* readed into an opening in the member 12 for connec-on with a *source of* fluid *under* pressure [source], scribed hereinafter. To simplify the explanation of is disclosure only fingers 13 [,] *and* 14 are de-ribed in detail and it should be understood that the ngers 15 [,] *and* 16 [are] *may be* like fingers 13 ,] *and* 14 in all respects. The fingers 13 [,] *and* 14 *ay* have inner side walls 13a [,] *and* 14a, *respec-ely*, which [are] *may bend and which will not elon-te substantially* [flexible but inelastic, at least in the ngitudinal direction of the fingers] , and the edges of e inner wall [are] *may be* each integral with [a exible and] *an* elongatable outer wall 13b [,] *and* 3b, respectively. *In order to be capable of bending sily, the walls 13a and 14a must be substantially flat, shown in FIG. 3.* The outer walls 13b [,] *and* 14b are] *may be* elongatable, *for example*, by reason of ansverse corrugations 13c [,] *and* 14c and in a rmal, *unstressed and unactuated* state, the fingers are] *may be* approximately straight, or at least in a laxed or non-gripping position. It will be apparent at if fluid is introduced into the fingers 13 [,] *and* [under pressure] *and pressurized*, the walls 13b ,] *and* 14b tend to elongate, and because *the* walls 3a [,] *and* 14a [are non-elastic] *do not elongate , at least*, [relatively] [non-elastic] *do not elon-te relative* [to] the walls 13c [,] *and* 14c, the rmally straight finger-like elements will *bend or* curl out the [non-elastic] *non-elongating* walls 13a ,] *and* 14a and thereby cause a gripping action of e fingers, as is illustrated in FIG. 1. The fingers 13–16 are] *may* preferably *be* molded of the material men-oned in a form *and configuration* so that when the ternal pressure of the finger approaches that of the mosphere the form *or configuration* of the finger turns to a position in which the walls 13a [a] *and* 3a are straight or nearly so. It will be understood that e fingers could be formed of other materials or in her forms having the characteristics of a [non-elongated] *non-elongatable or non-extendable* section *or portion* co-extending with an extendable *or elongatable* section *or portion. It will be further understood that, since the application of fluid pressure to the interior of the fingers results in an increased tendency of the fingers to curl, the application of fluid under pressure to the interior of the fingers results in the fingers producing a force or motion in a curling direction. Hence, the fingers may be said to define fluid motors which, upon the application or increase of fluid pressure internally thereof, produce a curling force which, if unresisted or insufficiently resisted, results in curling movement. This curling tendency or motor action may be harnessed in many ways, such as, for example, by utilizing the curling grip action thereof as in the heretofore described grasping or manipulating apparatus which utilizes the force as it is generated substantially entirely along the surface of the non-extendable portion or, the force or movement generated may be resisted or utilized at only one or more locations therealong. Obviously, the maximum movement will occur at the tip or closed end portion of the finger.*

Furthermore, the walls 13a [,] *and* 14a [are] *may* [preferably] *be* formed of material which af-fords a suitable gripping surface and [should be] wear [resistant] *resistance*. For example, it may be desirable to provide a roughened [thread] *tread* or surface which engages the article gripped thereby, as seen at 13d [,] *and* 14d.

The gripping action of the fingers 13–16 [is] *may be* controlled by directing fluid under pressure into *or otherwise increasing the pressure of fluid in* the fingers and the relaxing or [release] *releasing* of the gripping action [is] *may be* effected by releasing the fluid from *or otherwise reducing the pressure on the fluid in* the fingers, all of which may be effected at *or from* any suitable location relative to the hand member 11. *The source of pressurized fluid and the means and mechanism utilized to control, increase, decrease and affect the pressure of the fluid may be responsive to substantially any type or variety of energy source including, without limitation, electricity, heat, radiation, mechanical movement, and the like, either within or without the fingers.* In the form *or embodiment* of the invention shown, the openings in member 11 into which the finger couplings 18 are threaded receive the ends of branch tubes, two of which appear at 19 [,] *and* 20, which tubes [are] *may be* connected with a manifold 21 at the end of a fluid supply conduit 22 which [passes] *may pass* through *the* arm 17 and [is] *may be* connected with a suitable three-way control valve 24 installed at a convenient control position. The valve 24 [is] *may be* connected to a convenient fluid pressure system, not shown, by a connection 24a and [which] directs fluid into the conduit 22 through an outlet 24b by operation of a control handle 24c. *Where the fluid is to be conserved, as where a hydraulic oil is being utilized,* fluid may be bled from *the* conduit 22 into the low pressure side of the fluid system through a return line 24d by movement of the handle *24c* to a given control position. The details of valve 24 are not shown inasmuch as any suitable form of three-way valve could be employed, many of which are commercially available.

If desired, each finger or pair of fingers, i.e., opposite disposed fingers, could have its own source of controlled fluid pressure, *including means for modifying the pressure and/or volume of a quantity of fluid sealed or contained therein.*

It will be seen that by manipulating arm 17 so as to position the surface 12 of the hand member 11 against an object with the two pairs of fingers 13, 14 and 15, 16 along opposite sides thereof, and directing fluid under pressure into the fingers the fingers will curl about the object and grip it according to the pressure of the fluid in the fingers. *By increasing or decreasing the pressure of the fluid, the grip exerted may be modified.*

The arm 17 may then be manipulated to transfer the object gripped by the fingers to its desired destination or to otherwise manipulate the object whereupon the fluid may then be exhausted from the fingers and [ cause ] *enable* them to return to their normally straight positions and release the object. The fluid pressure for actuating the fingers can be supplied through flexible tubing so as to permit freedom in the manipulations of the hand member 11 in its movements of the gripped object.

It will be appreciated that by limiting the fluid pressure admitted to the fingers, the gripping pressure applied to the object can be controlled and either a pressure gauge or a pressure limiting *or regulating* control could be employed in the fluid pressure system.

It will be apparent that the invention is readily suitable for handling of objects by grasping the same and that the movement of the fingers 13–16 could as well be utilized *as fluid motors* for actuating *or operating* various types of mechanisms [ including ], control devices, signalling devices and the like, and that remote control of the apparatus is easily effected through the fluid tubing and control valving. Likewise, it will be appreciated that elements embodying the invention could be employed to simulate the movable joints of members of animated animals, for example.

Figure 4:
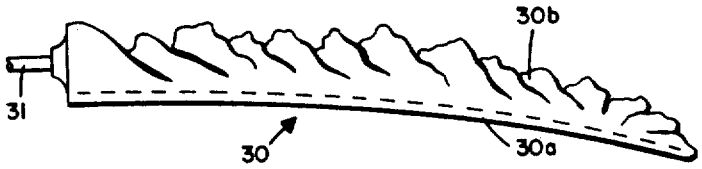
FIG. 4 is a side elevational view of a gripping member [embodying another form] *incorporating a fluid motor in accordance with the principles* of the *present* invention.
Figure 5:
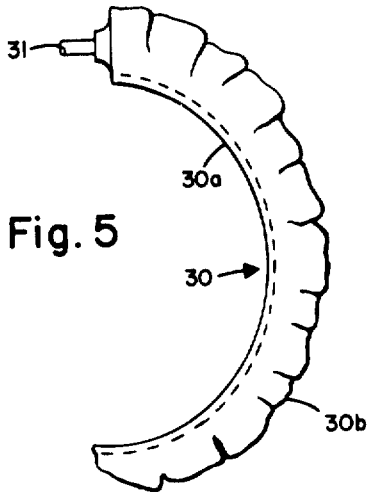
FIG. 5 is a view similar to FIG. 4, but showing the *motor and* member [in form] *as actuated* for gripping.

The elongated sides of the fingers *or motors* need not be corrugated but may be of a material which assumes a random shape when it is collapsed by the reduction of fluid pressure inside the fingers. Referring to FIGS. 4 [ , ] *and* 5, *a motor or* finger 30 is shown comprising a [ flexible ] *bendable* but relatively [ inelastic ] *non-elongatable* wall 30a which normally assumes a straight form, and which [ is ] *may be* integrally joined along *two generally transversely spaced apart, longitudinally extending locations or seams, such as* its edges and *along its* outer end to an [ expansible elongated ] *elongatable* side wall structure 30b which [ has no ] *need not have any* particular form and [ lies ] *which may lie* in random folds when the portion 30a of the finger is straight. By applying fluid under pressure into the finger *or motor* through a suitable tube 31, *or otherwise increasing the pressure therein*, the elongation of the part 30b and the inability of the side 20a to elongate, results in a curling *or tendency toward curling* of the element 30, as seen in FIG. 5. The finger 30 could be attached to any suitable apparatus or device to utilize its capacity for movement *or tendency toward movement* as described.

Figure 6:
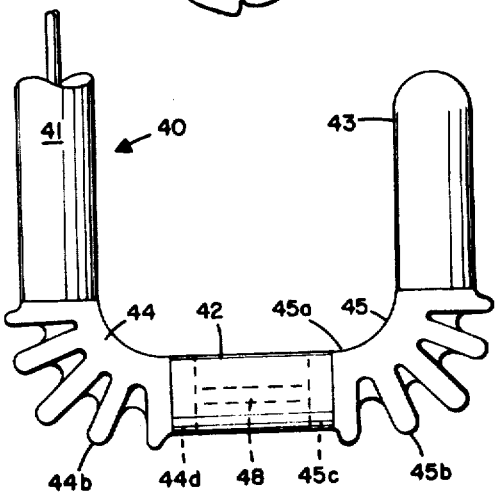
FIG. 6 is a fragmentary side elevational view of a flexing member embodying [still] another [form of] *motor in accordance with* the *present* invention.
Figure 7:
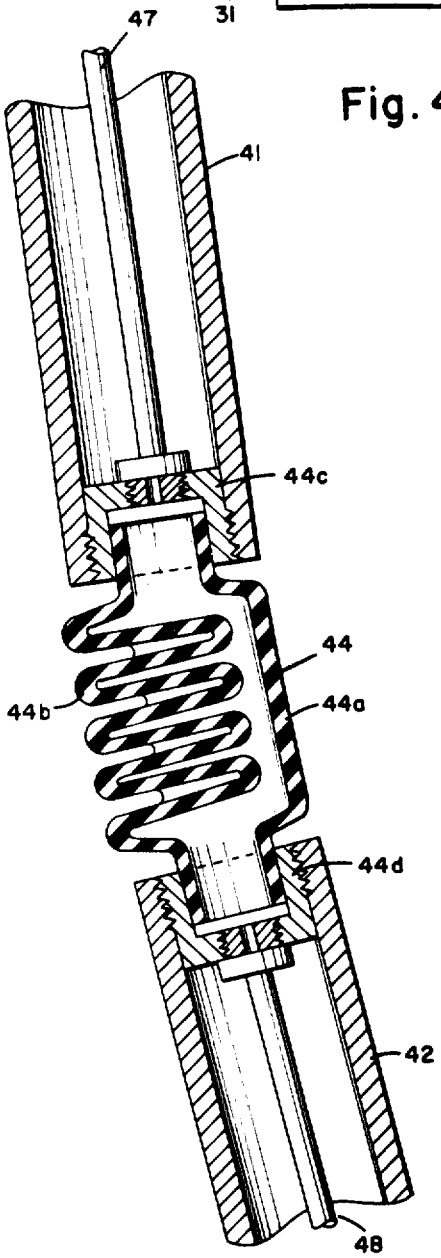
FIG. 7 is a sectional view of the flexing member shown in FIG. 6 [and] *illustrated* on a larger scale.

Referring to FIGS. 6 and 7, another [ form ] *device utilizing another embodiment* of the invention is disclosed in which an arm 40 is shown which comprises a plurality of sections of rigid tubular members 41, 42 [ , ] *and* 43 interconnected by flexing *motor* joints 44 [ , ] *and* 45 which *may* impart swinging movement to the arm section. The flexing *motor* joints 44 [ , ] *and* 45 *may* comprise tubular sections having [ flexible but inelastic ] *bendable but substantially non-elongatable* side walls 44a [ , ] *and* 45a [ in the longitudinal direction ] and elongatable wall portions 44b [ , ] *and* 45b, connected therewith in the form of corrugations, similar to the walls 13c [ , ] *and* 14c of the fingers 13 [ , ] *and* 14. The walls 44a, 44b, 45a, *and* 45b [ are ] *may be* formed of suitable material such as described with reference to the fingers 13–16. The ends of the sections 44 [ , ] *and* 45 *may* have threaded discs attached thereto and for the sake of simplicity only the discs 44c [ , ] *and* 44d of section 44 are shown. The discs 44c *and 44d* [ are ] *may be* threaded into the adjoining [ ends ] *end portions* of the rigid members 41 [ , ] *and* 42 and fluid under pressure [ is ] *may be* conducted to and exhausted from the joint 44 *as* by tubing 47. The [ tube ] *tubing* 47 [ is ] *may be* connected with a suitable fluid source including a valve arrangement, not shown, which could be similar to that described hereinbefore, and [ is ] *may be* attached in an opening through the disc 44c through which fluid [ is ] *may be* fed into the joint 44. One end of a tube 48 [ is ] *may be* attached in an opening through the disc 44d and the other end [ is ] *may be* attached in an opening through the disc 45c at the joint 45, which disc [ is ] *may be* like disc 44c, so that fluid from *the* joint 44 [ passes ] *may pass* into *the* joint 45 through *the* tube 48. It will be seen that when fluid pressure is applied to *the* line or [ tube ] *tubing* 47, the joint 45 [ is ] *and* 44 will flex and cause the rigid portions 41, 42 *and* 43 to move through a partially closed *or generally U-shaped* [ from ] *form or configuration, as* for supporting material or the like. *It may further be seen that the joints 44 and 45 are similar in action to an elbow or knee joint and would therefore be useful in providing animation. The flexible but inelastic walls 44 and 45 may be of longer or shorter length relative to the extendable walls 44b and 45b, as desired, and accordingly the radius or rate of rotation may be modified. Yet further, both the non-elongatable and the elongatable walls may, if desired, each be either uniformly bendable and uniformly elongatable, respectively, may be bendable and elongatable, respectively, at only discreet locations or portions therealong, or may be non-uniformly bendable and elongatable, respectively, without departing from the present invention so as to define units having, for example, alternating rigid and bendable portions such as shown in FIG. 6. Yet still further, a plurality of fluid motors constructed in accordance with the present invention, and each having a greater or lesser extent than those illustrated, may be joined directly together in end to end or tandem relationship, for increased versatility, efficiency and economy.*

It will be understood that although I have described three forms of the invention it is to be understood that other forms, modifications and adaptations thereof could be made without departing from the spirit and scope of the claims which follow.

I claim:

[ 1. An apparatus for gripping objects and the like comprising a base member, a pair of tubular members each supported at one end to said base member and normally extending relatively straight, each of said tubular members being closed at its extended end and each comprising a yieldable extendable side wall connected along the edges thereof with a relatively non-extendable side of said member, and means to direct fluid into said tubular members under pressure for causing extension of said extendable walls thereof thereby curving said non-extendable sides facing towards the other whereby said members curve in response to fluid pressure therein toward one another. ]

[2. An apparatus for supporting objects and the like comprising, two elongated rigid members arranged in end to end relation and connected by joint means comprising a tubular member having one side of flexible relatively non-extendable material and the opposite wall formed of flexible material and extendable elongatable in a direction said tubular members extend, means normally tending to maintain said members at a relatively substantial angle, and means for applying fluid pressure to said tubular member, whereby said elongated wall thereof is extended and about said non-extendable wall thereby causing relative angular movement between said members to decrease the normal angle therebetween.]

[3. A structure for gripping objects comprising a relatively rigid support element, a flexible hollow member having one end secured to said support element and the remainder thereof being free to flex, means to supply a fluid under pressure to the interior of said member, said flexible hollow member having an extendable wall adapted to elongate in response to fluid pressure applied inside said member, and flexible gripping means extending along one side of said extendable wall and connected therewith, said flexible gripping means being non-elongatable relative to said extendable wall whereby fluid pressure applied to the interior of said flexible member causes said extendable wall to elongate and flex about said gripping means and curve said gripping means away from said extendable wall for embracing an object, and means normally urging said member and flexible means toward a non-curving position to release an object embraced by said gripping means.]

[4. A structure as defined in claim 3 in which said hollow member comprises a finger-like element closed at the end remote from said support element, and said flexible gripping means comprises a side wall of said finger-like element formed of relatively non-elongatable flexible material which tends to assume a substantially straight attitude when fluid pressure in said hollow member is relatively low.]

[5. A structure as defined in claim 4 in which the exterior of said side wall has an outer surface adapted to grip articles.]

[6. A structure as defined in claim 3 in which said extendable wall comprises a corrugated section having the corrugations thereof extending transversely of the direction of elongation thereof.]

[7. A structure as defined in claim 4 in which said extendable wall is comprised of corrugations extending transversely of said extendable member.]

[8. An apparatus for gripping objects and the like comprising a support member including a base portion, a flexible tubular member supported at one end on said base portion and having the opposite end closed and free to swing by flexing, said tubular member being normally disposed in a relatively straight attitude, means forming a yieldable extendable side wall of said tubular member connected along the edges thereof with a relatively non-extendable side of said member, and means to direct fluid into said tubular member under pressure for causing extension of said extendable wall thereby curving said non-extendable side.]

[9. A structure as set forth in claim 3 in which said extendable wall comprises flexible material having random folds therein when said member is in a relatively straight attitude.]

*10. An apparatus for gripping objects and the like comprising a base member, a pair of tubular members each supported at one end to said base member and normally extending relatively straight, each of said tubular members being closed at its extended end and each comprising a yieldable extendable side wall connected along the edges thereof with a relatively non-extendable side of said member, and means to direct fluid into said tubular members under pressure for causing extension of said extendable walls thereof hereby curving said non-extendable sides, said tubular members being disposed with the non-extendable sides facing toward the other whereby said members curve in response to fluid pressure therein toward one another to grip an object therebetween.*

*11. An apparatus for supporting objects and the like comprising, two elongated rigid members arranged in end to end relation and connected by joint means comprising a tubular member having one side of flexible relatively non-extendable material and the opposite wall formed of flexible material and extendable in the direction said tubular members extend, means normally tending to maintain said members at a relatively substantial angle, and means for applying fluid pressure to said tubular member whereby said elongated wall thereof is extended and about said non-extendable wall thereby causing relative angular movement between said members to decrease the normal angle therebetween.*

*12. A structure for gripping objects comprising a relatively rigid support element, a flexible hollow member having one end secured to said support element and the remainder thereof being free to flex, means to supply fluid under pressure to the interior of said member, said flexible hollow member having an extendable wall adapted to elongate in response to fluid pressure applied inside said member, and flexible gripping means extending along one side of said extendable wall and connected therewith, said flexible gripping means being non-elongatable relative to said extendable wall whereby fluid pressure applied to the interior of said flexible member causes said extendable wall to elongate and flex about said gripping means and curve said gripping means away from said extendable wall for embracing an object, and means normally urging said member and flexible means toward a non-curving position to release an object embraced by said gripping means.*

*13. A structure as defined in claim 12 in which said hollow member comprises a finger-like element closed at the end remote from said support element, and said flexible gripping means comprises a side wall of said finger-like element formed of relatively non-elongatable flexible material which tends to assume a substantially straight attitude when fluid pressure in said hollow member is relatively low.*

*14. A structure as defined in claim 13 in which the exterior of said side wall has an outer surface adapted to grip articles.*

*15. A structure as defined in claim 13 in which said extendable wall is comprised of corrugations extending transversely of said extendable member.*

*16 A structure as defined in claim 12 in which said extendable wall comprises a corrugated section having the corrugation thereof extending transversely of the direction of elongation thereof.*

*17. A structure as set forth in claim 12 in which said extendable wall comprises flexible material having random folds therein when said member is in a relatively straight attitude.*

*18. An apparatus for gripping objects and the like comprising a support member including a base portion, a flexible tubular member supported at one end on said base portion and having the opposite end closed and free to swing by flexing, said tubular member being normally disposed in a relatively straight attitude, means forming a yieldable extendable side wall of said tubular member connected along the edges thereof with a relatively non-extendable side of said member, and means to direct fluid into said tubular member under pressure for causing extension of said extendable wall thereby curving said non-extendable side.*

*19. An apparatus for supporting objects and the like comprising, two longitudinally extensive rigid members arranged in end to end relation and connected by joint means comprising a tubular member having one side wall of relatively non-elongatable substantially flat material and the opposite side wall formed of bendable material elongatable in the direction said tubular members extend, means normally tending to maintain said members at a relatively substantial angle, and means for enabling a fluid pressure increase within said tubular member so that said elongatable wall thereof is extended and bends or curls about said non-elongatable wall causing relative angular movement between said members to decrease the normal angle therebetween.*

*20. A structure for gripping objects comprising a relatively rigid support, a bendable hollow member having one end secured to said support element and the remainder thereof being free to bend, means to provide a fluid pressure increase internally of said member, said bendable hollow member having a wall adapted to elongate in response to fluid pressure increase inside said member, and bendable gripping means extending along one side of said wall and connected therewith, said gripping means being substantially flat and non-elongatable relative to said wall so that fluid pressure increases applied to the interior of said flexible member causes said wall to elongate and bend about said gripping means and curve said gripping means away from said wall for embracing an objects and means normally urging said member toward a non-curving position to release an object embraced by said gripping means.*

*21. A structure as defined in claim 20 in which said hollow member comprises a finger-like element closed at the end remote from said support, and said gripping means comprises a side wall of said finger-like element formed of relatively non-elongatable material which tends to assume a substantially straight attitude when fluid pressure in said hollow member is relatively low.*

*22. A structure as defined in claim 21 in which the exterior of said side wall has an outer surface defining said gripping means adapted to grip articles.*

*23. A structure as defined in claim 21 in which said elongatable wall is comprised of corrugations extending transversely of said extendable member.*

*24. A structure as defined in claim 20 in which said elongatable wall comprises a corrugated section having the corrugations thereof extending transversely of the direction of elongation thereof.*

*25. A structure as set forth in claim 20 in which said elongatable wall comprises flexible material having random folds therein when said member is in a relatively straight attitude.*

*26. An apparatus for gripping objects and the like comprising a support member including a base portion, a bendable hollow member supported at one end on said base portion and having the opposite end closed and free to swing by bending, said hollow member being normally disposed in a relatively straight attitude, means forming an elongatable side wall of said tubular member connected along the edges thereof with a substantially flat relatively non-elongatable side of said member, and means to direct fluid into said hollow member under pressure for causing elongation of said elongatable wall thereby curving said non-elongatable side.*

*27. Article of manufacture comprising a base portion; a longitudinally extensive tubular member supported at one end portion of said base portion, said tubular member comprising, in turn, means forming an elongatable side wall projecting outwardly of said base portion, means forming a bendable substantially non-elongatable side wall projecting outwardly of said base portion along and on one side of said extendable side wall and means connecting the edges and remote end portions thereof together in fluid impervious relationship; a quantity of fluid contained within said member and means for increasing the fluid pressure therein for causing elongation of said elongatable side wall and thereby curving said tubular member along said non-elongatable wall.*

*28. Article of manufacture defined in claim 27 wherein said fluid pressure increasing means comprises conduit means mounted with said base portion for directing fluid under pressure into said tubular member.*

*29. Article of manufacture defined in claim 27 wherein said non-elongatable side wall is of generally straight configuration and comprises sufficient rigidity to support said tubular member when the fluid is unpressurized.*

*30. An apparatus for gripping objects and the like comprising a base member, a pair of tubular members each supported at one end to said base member and normally extending relatively straight, each of said tubular members being closed at its extended end and each comprising an elongatable side wall connected along the edges thereof with a relatively non-elongatable substantially flat side wall of said member, and means to direct fluid into said tubular members under pressure for causing elongation of said elongatable walls thereof thereby curving said non-elongatable sides, said tubular members being disposed with the non-elongatable sides facing towards each other whereby said members curve in response to increased fluid pressure therein toward one another to grip an object therebetween.*

* * * * *